United States Patent [19]

Turner

[11] Patent Number: 4,561,090
[45] Date of Patent: Dec. 24, 1985

[54] INTEGRATED SELF-CHECKING PACKET SWITCH NODE

[75] Inventor: Jonathan S. Turner, Evanston, Ill.

[73] Assignee: AT&T Bell Laboratories, Murray Hill, N.J.

[21] Appl. No.: 495,716

[22] Filed: May 18, 1983

[51] Int. Cl.$^4$ .................. H04Q 11/04; H04J 3/00; H04J 6/00
[52] U.S. Cl. ............................. 370/60; 370/13; 370/94
[58] Field of Search .............. 370/94, 13, 60; 371/53, 371/71

[56] References Cited

U.S. PATENT DOCUMENTS

| | | | |
|---|---|---|---|
| 4,081,612 | 3/1978 | Hafner | 370/60 |
| 4,225,919 | 9/1980 | Kyu et al. | 370/13 |
| 4,271,506 | 6/1981 | Broc et al. | 370/60 |
| 4,314,367 | 2/1982 | Bakka et al. | 370/60 |
| 4,320,500 | 3/1982 | Barberis et al. | 370/60 |
| 4,354,263 | 10/1982 | Bordry et al. | 370/60 |
| 4,398,290 | 8/1983 | Mathieu et al. | 370/94 |

OTHER PUBLICATIONS

Aug. 1979 Bolt Beranek and Newman, Inc., Report No. 4098, "Development of a Voice Funnel System".

Primary Examiner—Douglas W. Olms
Assistant Examiner—Wellington Chin
Attorney, Agent, or Firm—John C. Moran

[57] ABSTRACT

A detection circuit for monitoring the operations of a packet switch node to detect the loss or erroneous creation of packets within the switch node. The switch nodes are interconnected to form a packet switching network, and switching networks are interconnected by trunk controllers to form a packet switching system. A communication path is set up through such a switching system by initially routing a call setup packet from an originating terminal to each central processor controlling a switching network in the route to a destination terminal. Each central processor is responsive to a receipt of the setup packet to store logical to physical address translation information in memories of its associated trunk controllers. The physical address defines a path through the switching network to an output trunk controller in the communication path to the destination terminal. In response to the receipt of each subsequent message packet, each trunk controller utilizes its memory information for translation and the assemblage of a new packet containing the physical address plus the message packet. The controller then sends the new packet to the switching network. The switch nodes within the switching network are responsive to the physical address in the new packet for establishing the physical path to the output trunk controller. The detection circuit within a packet switch node determines the difference between the number of packets received by the node and the number of packets transmitted by the node and indicates an error condition within the node if the difference falls outside an allowable range.

15 Claims, 14 Drawing Figures

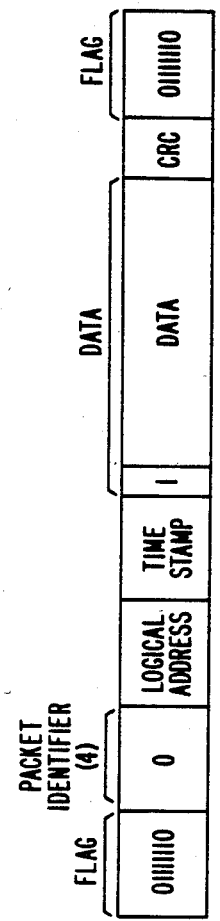
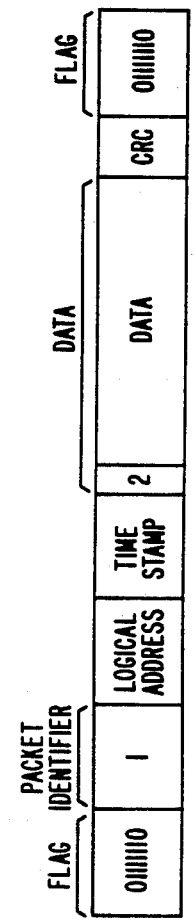
FIG. 3
FIG. 4

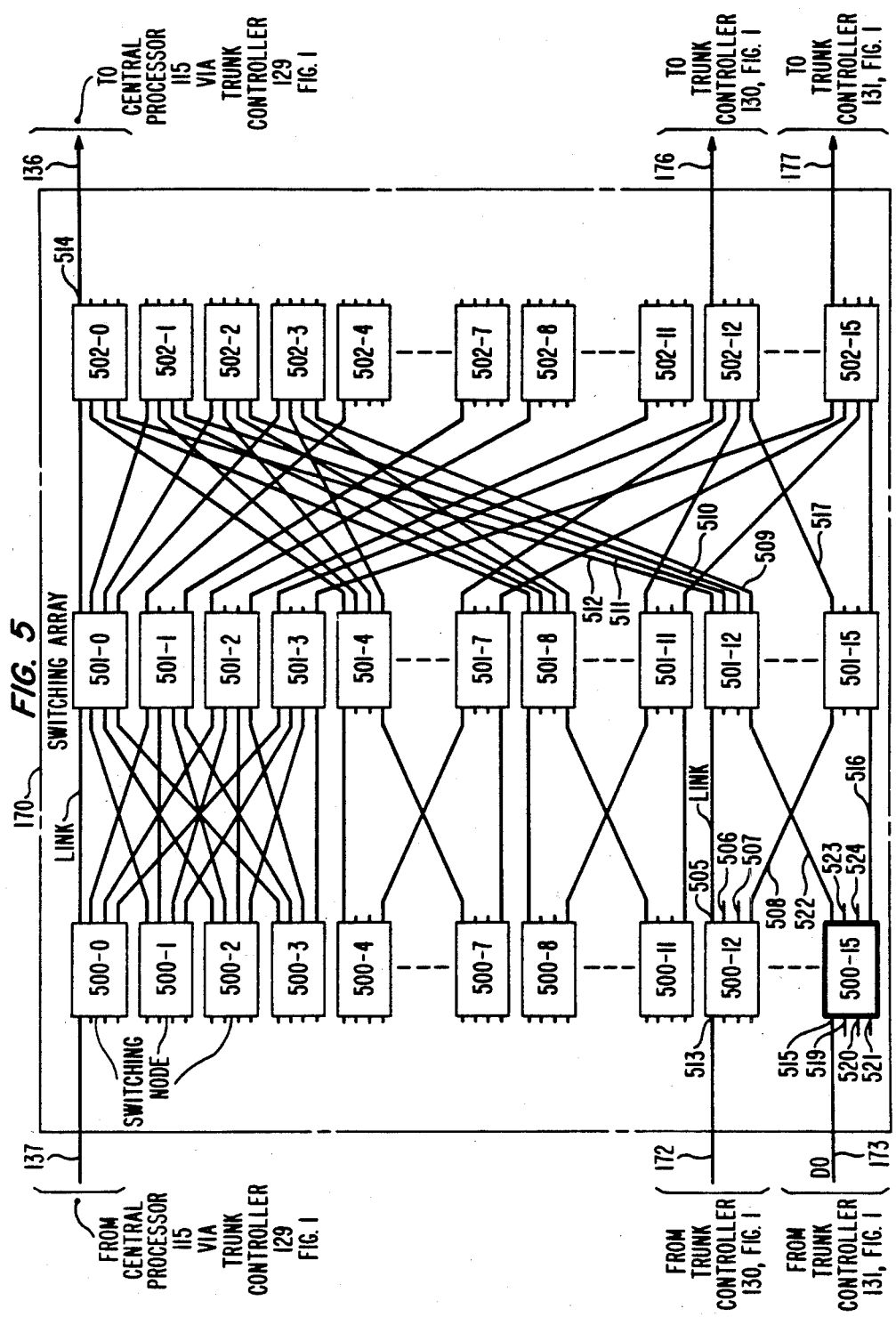

FIG. 6

| PACKET LENGTH | DEST TRUNK CNTRLR | SOURCE TRUNK CNTRLR | CONTROL | ARRIVAL TIME | PACKET IDENTIFIER | LOGICAL ADDRESS | TIME STAMP | DATA | CRC |
|---|---|---|---|---|---|---|---|---|---|
| START BIT | 000000 | 48 | 0 | | | 0 | 1 | | |

FIG. 7

| PACKET LENGTH | DEST TRUNK CNTRLR | SOURCE TRUNK CNTRLR | CONTROL | ARRIVAL TIME | PACKET IDENTIFIER | LOGICAL ADDRESS | TIME STAMP | DATA | CRC |
|---|---|---|---|---|---|---|---|---|---|
| START BIT | 110000 | 60 | 0 | | | 1 | 2 | | |

FIG. 8

| PACKET LENGTH | DEST TRUNK CNTRLR | SOURCE TRUNK CNTRLR | CONTROL | ARRIVAL TIME | PACKET IDENTIFIER | LOGICAL ADDRESS | TIME STAMP | DATA | CRC |
|---|---|---|---|---|---|---|---|---|---|
| START BIT | 000011 | 60 | 0 | | | 1 | 2 | | |

FIG. 9

| PACKET LENGTH | DEST TRUNK CNTRLR | SOURCE TRUNK CNTRLR | CONTROL | ARRIVAL TIME | PACKET IDENTIFIER | LOGICAL ADDRESS | TIME STAMP | DATA | CRC |
|---|---|---|---|---|---|---|---|---|---|
| START BIT | 001100 | 60 | 0 | | | 1 | 2 | | |

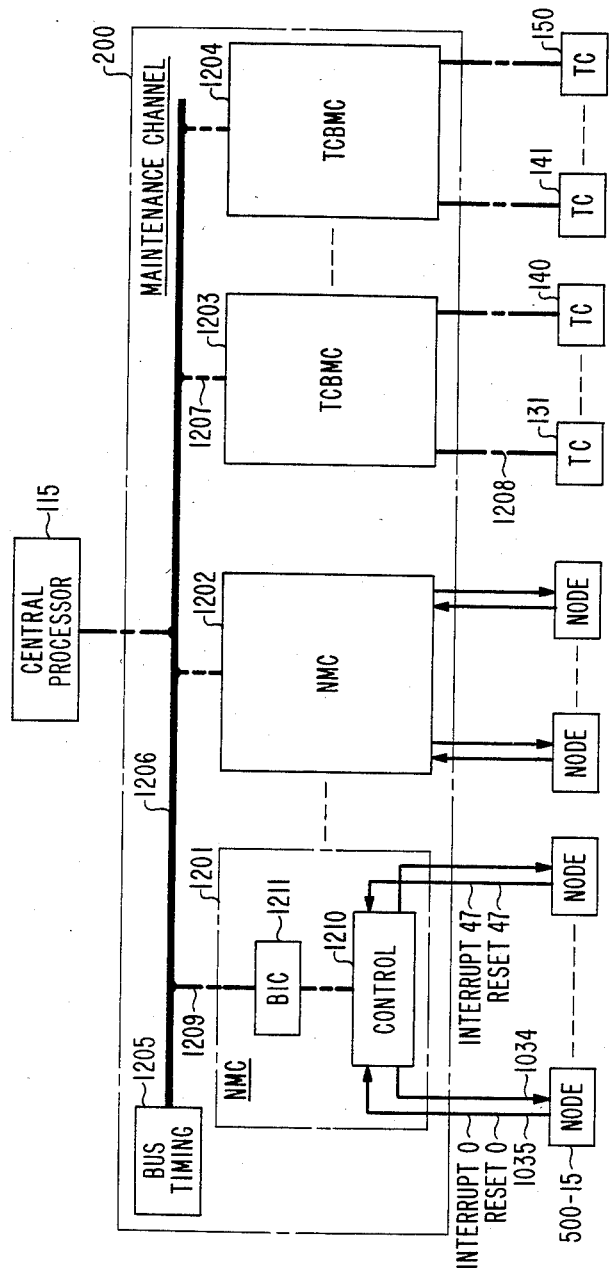

INTEGRATED SELF-CHECKING PACKET SWITCH NODE

CROSS-REFERENCE TO RELATED APPLICATIONS

The following applications were filed on June 25, 1982, and assigned to the same assignee as this application:

J. S. Turner, "Fast Packet Switch", Ser. No. 392,378, U.S. Pat. No. 4,491,945;

J. S. Turner, "An Interface Facility for a Packet Switching System", Ser. No. 392,228, U.S. Pat. No. 4,488,289;

J. S. Turner, "End-To-End Information Memory Arrangement in a Line Controller", Ser. No. 392,227, U.S. Pat. No. 4,488,288;

J. S. Turner, "Packet Switching Loop-Around Network and Facilities Testing", Ser. No. 392,381, U.S. Pat. No. 4,486,877;

J. S. Turner, "A Fast Packet Switching Network", Ser. No. 393,112, U.S. Pat. No. 4,494,230; and W. A. Montgomery, "Time Stamping for a Packet Switching System", Ser. No. 392,377.

The following application was filed on Nov. 1, 1982, and assigned to the same assignee as this application:

J. S. Turner, "Duplicated Network Arrays and Control Facilities for Packet Switching", Ser. No. 438,572.

The following application was filed on Nov. 4, 1982, and assigned to the same assignee as this application:

J. S. Turner, "Packet Load Monitoring By Trunk Controllers", Ser. No. 439,079, U.S. Pat. No. 4,484,326.

The following application was filed on Dec. 13, 1982, and assigned to the same assignee as this application:

J. S. Turner, "Packet Error Rate Measurements by Distributed Controllers", Ser. No. 449,553, U.S. Pat. No. 4,490,817.

TECHNICAL FIELD

This invention relates to a method and packet switching facilities for the integrated communication of voice and data signals. In particular, the method and packet switching facilities provide for the self-checking of each packet switch node within a packet switching network.

BACKGROUND OF THE INVENTION

A system for the switching and transmission of packetized information is disclosed in the above-identified applications. For example, J. S. Turner, U.S. Pat. No. 4,490,230 describes a system comprising fast packet switching networks interconnected by high-speed digital trunks with each trunk being terminated on both ends by a trunk controller.

A communication path is set up through that system by initially routing a call setup packet from an originating terminal to each central processor controlling a switching network in the route to the destination terminal. Each central processor is responsive to a receipt of the setup packet to store logical to physical address translation information in memories of its associated trunk controllers. The physical address defines a path through the switching network to an output trunk controller in the communication path to the destination terminal. In response to receipt of each subsequent message packet, each trunk controller utilizes its memory information for translation and the assemblage of a new packet containing the physical address plus the message packet. The controller then sends the new packet to the switching network. The switching network comprises switch nodes which are responsive to the physical address in the new packet for establishing the physical path to the output trunk controller.

A problem in such packet switching networks is that, if a switch node fails to route a received packet or erroneously creates a packet, this can only be detected at the edges of the packet switching system. Whereas, modern packet protocols such as X.25 (CCITT, 1976, Amended 1980) detect such errors at the edges of the packet switching system; such detection takes a great deal of time during which the reliability and accurate switching of many packets is adversely affected.

SUMMARY OF THE INVENTION

The foregoing problem is solved in accordance with the principles of the invention as disclosed in an illustrative method and structural embodiment in which the detection of a failing packet switch node is improved by the provision for self-checking in each packet switch node allowing the immediate identification of a failing node. A departure in the art is achieved by a detecting circuit in a packet switching node that determines the difference between the number of packets received by the node and the number of packets transmitted by the node and indicates an error condition within the node if the difference falls outside an allowable range.

Each node has a plurality of input terminals and a plurality of output terminals, and the detector circuit has an input packet monitor circuit associated with each input terminal and an output packet monitor circuit associated with each of the output terminals. When the node receives a packet on an input terminal, the associated input monitor circuit generates a packet receive signal; and when the node transmits a packet on an output terminal, the associated output monitor circuit transmits a packet transmitted signal. Both signals are used to determine the difference between the number of packets received and transmitted by the node.

Each of the packets comprises a length field for defining the number of bits in each packet. Each input packet monitor circuit has circuitry for detecting the start of the packet to generate the packet receive signal, storing the contents of the length field, counting the number of received packet bits, and comparing the counted number of bits to the stored length field for determining the end of the packet. Upon determining that the entire packet has been received, the input packet monitor circuit initializes itself for detecting the start of the next packet.

Advantageously, the detector circuit comprises a counter circuit responsive to the packet receive and packet transmitted signals for incrementing and decrementing, respectively. The counter circuit's contents represent the determined difference.

Advantageously, the detection circuit further comprises two comparators for comparing the contents of the counter against an upper and a lower limit for determining the allowable range of the counter. The allowable range is the minimum and maximum number of packets that can be stored in a node at any instant of time. If the range is exceeded, the comparators detect this fact and cause an error signal to be generated.

Within a high-speed switching network that has a plurality of switch nodes interposed between a plurality of input and output conductors with each of such nodes comprising a circuit for automatically routing packets to subsequent switch nodes or output conductors, an interface facility provides a communication path between the switch nodes and a processor controlling the switching network. In response to the generation of an error signal, the interface facility forms a packet containing the error signal and information identifying the switch node to the processor. In response to the packet, the processor performs the necessary maintenance functions and transmits a return packet to the interface facility for resetting the switch node in error.

The illustrative method involves the steps of determining bit signals representing the difference between the number of received packets and the number of transmitted packets and indicating inoperative conditions in the node upon excursions of the determined bits beyond predefined difference limits. The determining step further comprises the steps of incrementing the determined bits upon the receipt of a packet in decrementing the determined bits upon the transmission of a packet.

BRIEF DESCRIPTION OF THE DRAWING

FIG. 3 illustrates the contents of a call setup packet which is routed from an originating customer terminal to a destination customer terminal through the switching system;

FIG. 4 illustrates the contents of the call reply packet transmitted from the destination customer terminal to the originating customer terminal in response to the receipt of the call setup packet;

FIG. 5 is a detailed block diagram of switching array 170;

FIG. 6 illustrates a switch packet which is used to route the call setup packet of FIG. 3 from trunk controller 130 to central processor 115 via switching network 116 and trunk controller 129;

FIGS. 7 through 9 illustrate the contents of the switch packet used to transmit the call reply packet of FIG. 4 through switching network 116 as the packet progresses through the different stages of switching network 116 from trunk controller 131 to trunk controller 130;

FIG. 12 is a detailed block diagram of maintenance channel 200.

FIG. 13 illustrates the contents of a maintenance channel packet.

The principles of this invention are disclosed as incorporated, by way of example, in a packet switching system of the type disclosed in J. S. Turner, U.S. Pat. No. 4,490,230. The latter disclosure may be consulted for a further understanding of the construction and operation of the elements illustrated in FIGS. 1 and 2.

DETAILED DESCRIPTION

Figure 1:
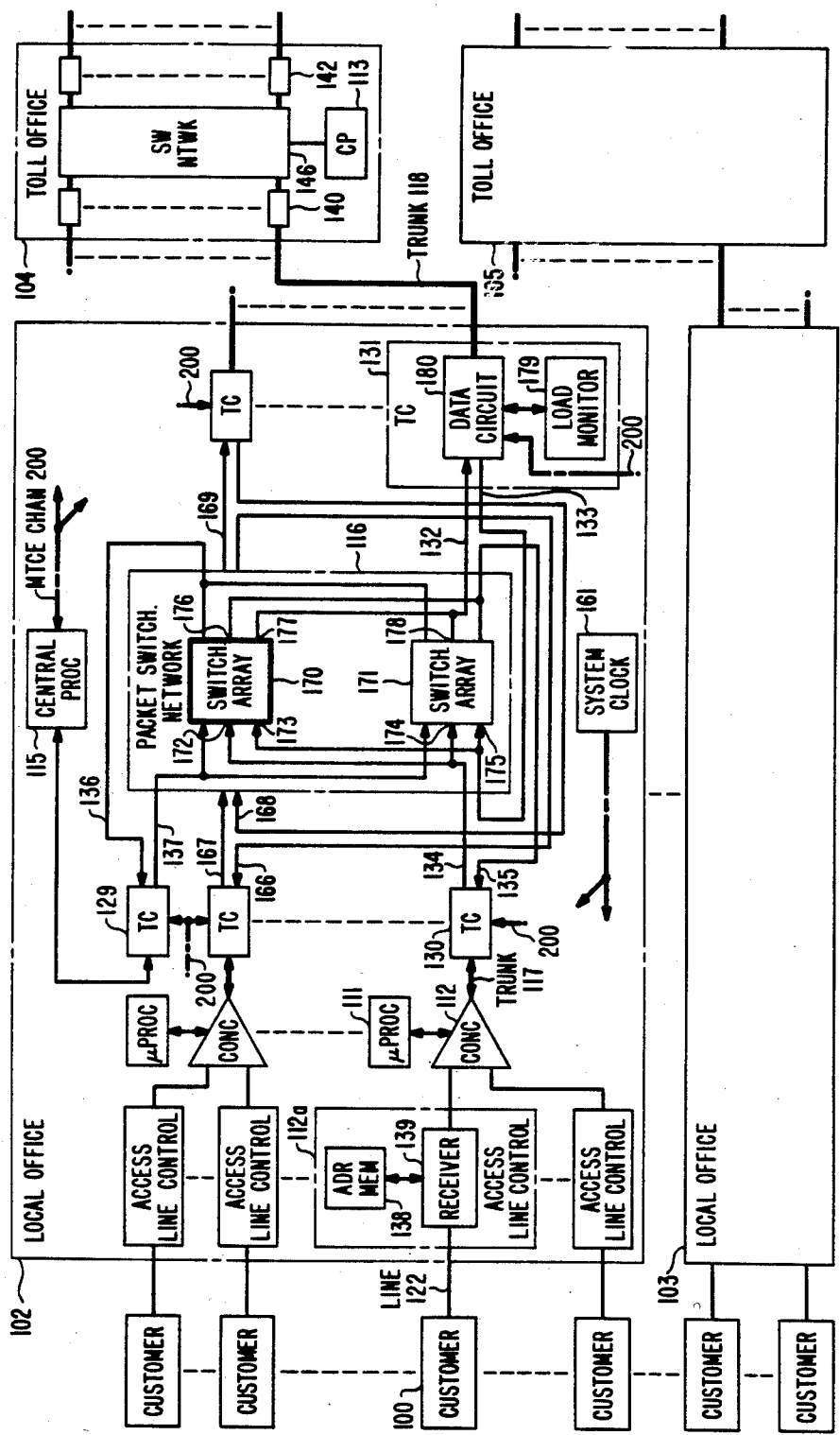
FIGS. 1 and 2 illustrate, in block diagram form, a communication system utilizing the switch node (also referred to as a switching node) of the present invention.
Figure 2:
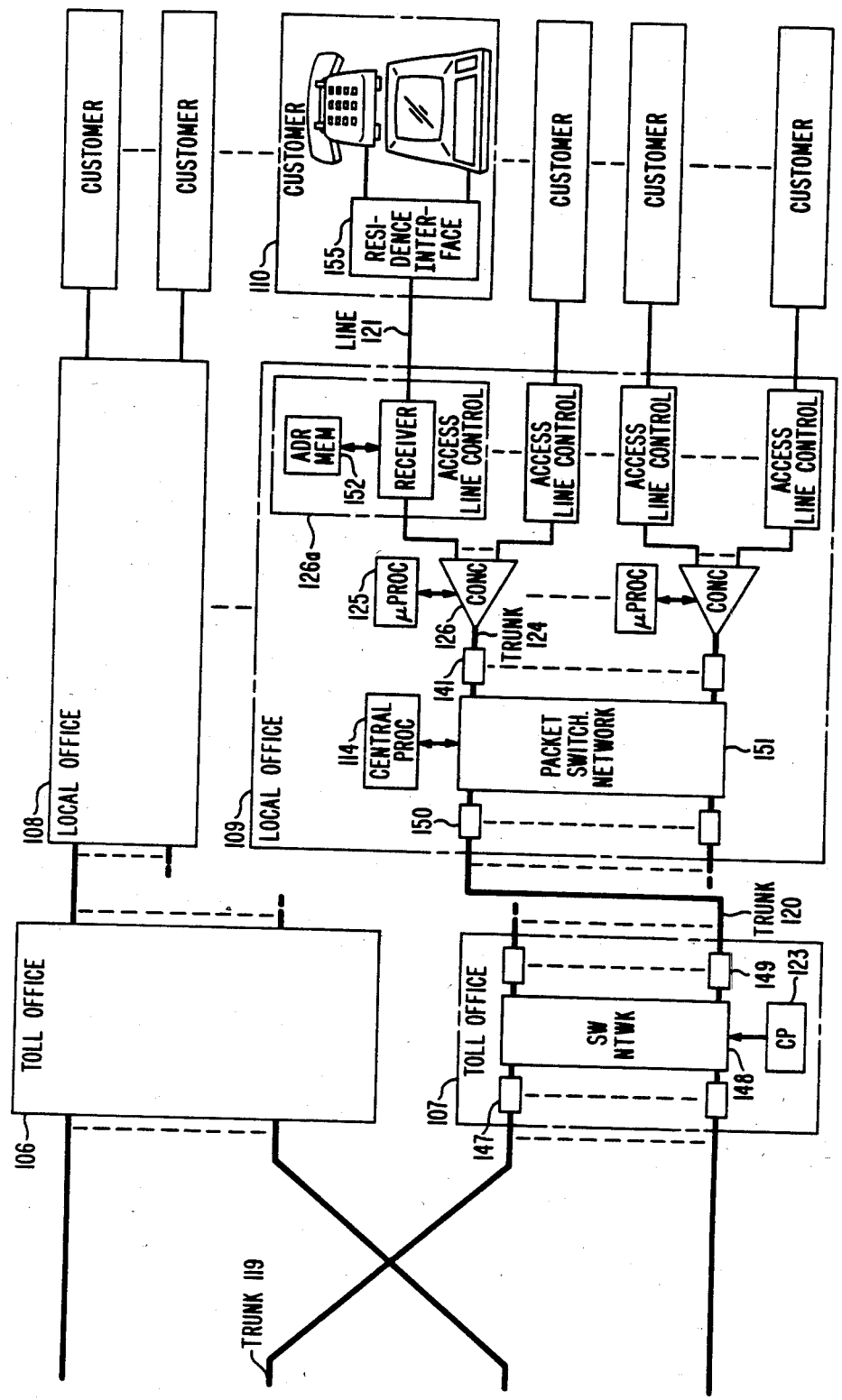

FIGS. 1 and 2 show an illustrative packet switching system having a plurality of local offices 102, 103, 108 and 109, and a plurality of toll offices 104–107 serving a plurality of customers such as customers 100 or 110. The following description first presents a general description of the subsystems constituting the packet switching system of FIGS. 1 and 2. Next, a description is presented of the manner in which a packet transmitted from a customer 100 residence interface to customer 110 residence interface has the necessary self-routing information inserted into it by each trunk controller in its route through the packet switching system. Once the routing of the packet through the switching system has been described, the procedure used to compile the routing information is then described; and then, the method used to store this information in each trunk controller in the route is described. Finally, a detailed description of an individual switching node in switching network 116 is given emphasizing the structure within the node which detects the destruction or creation of a packet within the node.

As shown in FIG. 1, local office 102 comprises switching network 116 which contains duplicate switching arrays 170 and 171. Switching network 116 terminates a plurality of trunk controllers and cooperates with central processor 115 via a central processor trunk controller 129 which is also connected to the switching network. Trunk controller 131, for example, receives information from switching network 116 via conductor 132 and transmits information to switching network 116 via conductor 133.

Switching network 116 further comprises two identical but separate switching arrays, arrays 170 and 171. Each trunk controller can receive information from, and transmit information to, either switching array. For example, trunk controller 131 receives information from switching array 170 via conductor 177, and receives information from switching array 171 via conductor 178. Trunk controller 131 transmits information to switching array 170 via conductor 173, and transmits information to switching array 171 via conductor 175.

On the customer side of local office 102, the local office is connected to customers via concentrators which are interconnected to the switching network via trunk controllers. A concentrator has an internal switching architecture similar to that of switching network 116 which is described in greater detail later and has a self-contained trunk controller which interfaces the concentrator to the attached trunk. The concentrator's trunk controller is similar to trunk controller 131 which is described in greater detail later. Each concentrator has connected to it a microprocessor which is used in conjunction with the attached access line controller to perform the initial call setup sequences and to provide call supervision as a supplement to the inherent self-routing characteristics of the packets being transmitted through the packet switching system. The customer units are connected to the concentrators by the access line controllers. Each access line controller stores logical address and control information which is stored in the access line controller by the controlling microprocessor. This logical address information is used to control the first portion of the route taken by the packets transmitted through the attached switching network via the interconnecting trunk controller. Each access line controller is connected to a resident interface contained within each customer unit via standard bilateral transmission media. Packets are transmitted between the access line controllers and the resident interfaces using standard packet protocols which define three virtual channels for communication between the resident interface and the access line controller.

Each trunk controller comprises a memory containing a translation table for converting the logical addresses into switch addresses which are used by the switching network to route the packets to the destination trunk controller.

Maintenance channel 200 provides maintenance communication between central processor 115 and its associated trunk controllers and switching nodes with switching network 116. Switching network 116 is interconnected to toll offices such as 104 by high speed trunks with each trunk being terminated on both ends by a trunk controller. The subject matter of FIG. 1 is substantially duplicated in FIG. 2.

The procedure for obtaining and storing self-routing information in address memories of the appropriate address line controllers and trunk controllers is now described. The information is obtained by a call setup packet being transmitted from the appropriate access line controller connected to the originating customer unit through the various microprocessors and central processors which are associated with the different concentrators and local and toll offices which form the route through which the call setup packet must traverse in order to reach the destination customer unit. As the call setup packet progresses along this route, each processing entity inserts a new logical address into the packet and stores the necessary logical and switch address information in the appropriate access line controller or trunk controllers. Once the call setup packet is received at the microprocessor attached to the concentrator to which the destination customer unit is connected via an access line controller, the receiving microprocessor transmits the appropriate logical and switch address information to the connected access line controller, which stores it in its address memory. The receiving microprocessor then assembles and transmits a call reply packet, which indicates that the call has been properly set up. After the call reply packet is received by the originating customer access line controller, all the necessary routing information is set up in the access line controllers and trunk controllers forming the packet route so that packets can be directly routed through the switching networks without the packets having to be handled by the associated processing entities.

The utilization of the call setup packet is now illustrated in greater detail by describing the establishment of a telephone call between customers 100 and 110. Customer 100 calls customer 110 by dialing the customer 110 telephone number. The residence interface associated with customer 100 collects the dialed digits in the conventional manner. After the residence interface has collected the dialed digits, it transmits the dialed digits in a packet via line 122 to access line controller 112a. In response to the packet received from the residence interface associated with customer 100, access line controller 112a assembles and transmits the packet shown in FIG. 3 to microprocessor 111 via concentrator 112. The packet identifier field identifies this packet as a signaling packet and a "1" in the most significant byte of the data field indicates that the packet is a call setup packet. The remainder of the data field contains the dialed telephone number.

Upon receipt of the packet of FIG. 3, microprocessor 111 examines the dialed telephone number and determines that a connection is required through switching network 116. First, microprocessor 111 transmits to access line controller a new logical address to be used in subsequent packets and the switch address defining concentrator 112's trunk controller which connects trunk 117 to concentrator 112. This switch address is used by concentrator 112 to route subsequent packets to trunk 117. Next, microprocessor 111 stores in concentrator 112's trunk controller the switch address identifying access line controller 112a and information defining the virtual channel to be used by access line controller 112a in communicating with the residence interface associated with customer 100. Finally, microprocessor 111 assembles a packet similar to the one shown in FIG. 3, but having the logical address in the logical address field which had been stored in the address memory of access line controller 112a. This new packet is then transmitted to central processor 115 via concentrator 112, trunk 117, trunk controller 130, switching network 116, and trunk controller 129.

Upon receipt of the packet from microprocessor 111, processor 115 determines from the dialed telephone number by performing a table look-up operation that the call must be sent through to office 104. Processor 115 first transmits the logical address contained in the received packet and the switch address identifying trunk controller 130 to trunk controller 131. Trunk controller 131 stores this address information in an internal memory and uses this information to perform the necessary logical to switch address translation on subsequent packets associated with the call being set up. Processor 115 then transmits to trunk controller 130 a new logical address and the switch address identifying trunk controller 131. This address information is used to perform the necessary logical to switch address translation for routing packets from trunk controller 130 to trunk controller 131 associated with the call being set up through switching network 116. The last operation performed by processor 115 is to transmit a call setup packet similar to that shown in FIG. 3 to central processor 113 via switching network 116, trunk controller 131, trunk 118, trunk controller 140 and switching network 146. The packet transmitted to processor 113 has in the logical address field the logical address information identical to that previously stored in trunk controller 130.

Upon receipt of the packet from trunk 118, processor 113 performs operations in response to this packet similar to those performed by processor 115 as previously described with respect to the call setup packet. Processor 113 then transmits a call setup packet to central processor 123 via switching network 146, trunk controller 142, trunk 119 trunk controller 147, and switching network 148. Processor 123 performs similar operations to those performed by processor 113 and transmits a new call setup packet to central processor 114 via switching network 148, trunk controller 149, trunk 120, trunk controller 150, and switching network 151. Upon receipt of the call setup packet from processor 123, central processor 114 stores the logical address information of this packet and the switch address designating trunk controller 150 in trunk controller 141. Central processor 114 then transmits a new logical address and the switch address designating trunk controller 141 to trunk controller 150, which stores this information. After storing the necessary information in trunk controllers 141 and 150, processor 114 assembles a new call setup packet having the logical address which had previously been stored in trunk controller 150 in the logical address field and transmits this call setup packet to microprocessor 125 via switching network 151, trunk controller 141, trunk 124, and concentrator 126.

Upon receipt of the call setup packet from processor 114, microprocessor 125 reads the logical address information contained in the logical address field and stores the logical address in address memory 152 of access line controller 126a. Microprocessor 125 then transmits a call reply packet as illustrated in FIG. 4 to microprocessor 111 via the previously defined route through the packet switching systems of FIGS. 1 and 2. The logical address field of the packet of FIG. 4 contains the logical address which microprocessor 125 received in the call setup packet from processor 114. Trunk controller 141 is responsive to the receipt of the packet of FIG. 4 to translate the contents of the logical address field using the previously stored logical address to switch address translation information and to insert the previously stored logical address into the call reply packet. The switch address which results from this translation by trunk controller 141 designates trunk controller 150. This switch address is used by switching network 151 to route the call reply packet to trunk controller 150. Trunk controller 150 is responsive to receipt of the call reply packet to transmit this packet to trunk controller 149 via trunk 120. The call reply packet is similarly routed through the various trunk controllers until it is received by microprocessor 111. Once the call reply packet is received by microprocessor 111, all the necessary information for routing calls through the various switching networks is stored within the trunk controllers and access line controllers in the route.

Switching array 170 of switching network 116 is shown in greater detail in FIG. 5. All connections to switching array 170 are made through the trunk controllers shown on FIG. 1. Similar connections are made to switching array 171 of switching network 116. The trunk controllers receive information at a 1.54 Mb/s rate and transmit this information into the network at an 8 Mb/s rate. Each trunk is capable of buffering five packets of information from the attached trunk. The buffering of packets at the input from the trunks is necessary because the packets may have to be delayed before they can be transmitted through the network. Buffering is also needed by the trunk controllers for information being received from the network before it can be retransmitted on the attached trunk. Each trunk controller is capable of buffering up to 40 packets of information from the network before commencing retransmission out on the trunk. Each trunk controller has one input connection and one output connection to switching array 170. For example, trunk control 130 transmits information to switching array 170 via conductor 172 and receives data from switching array 170 via conductor 176 as shown in FIG. 5.

Switching array 170 comprises three stages of switching nodes. The first stage comprises nodes 500-0 through 500-15, the second stage comprises switching nodes 501-0 through 501-15, and the third stage comprises switching node 502-0 through 502-15. Transmission through the array is from left to right. Each switching node is a packet switch. Each packet switch has four inputs and is capable of buffering one packet on each input. The packets received on any input are transmittable on any of the four output terminals of the packet switch. After receipt of a packet on an input terminal, the address contained in that packet is used to determine which output terminal should be used to retransmit the packet. Only the two most significant bits of the address are used to designate the output terminal for a particular switching node. For example, switching node 500-12 retransmits the packet on link 505 if the most significant bits are equal to zero, on link 506 if the most significant bits are equal to one, on link 507 if the most significant bits are equal to two, and on link 508, if the most significant bits are equal to three.

Each node properly rearranges the address bits so that the receiving switching node in the next stage has the correct bits in the most significant bit positions in order to determine which output terminal should be used to retransmit the packet at that stage.

The operation of switching array 170 as shown in FIG. 5 can be better understood by considering the example of the switching of the packet shown in FIG. 3 through this array to central processor 115. The packet shown in FIG. 3 is transmitted by microprocessor 111 via trunk 117 to switching array 170. Upon receipt of the packet shown in FIG. 3, trunk controller 130 forms a new packet which is illustrated in FIG. 6.

The new packet is formed by taking the original packet received from trunk 117, removing the flags and stuffed bits, and then adding the new fields of start bit, packet length, destination trunk controller, source trunk controller, control, arrival time, and a new CRC field. Trunk controller 130 responds to the packet identifier containing a "0" by inserting a "0" into the destination trunk controller field. This is the trunk number for trunk controller 129 to which central processor 115 is connected. Trunk controller 130 inserts its own output connection number on switching network 116 (in this example 48) into the source trunk controller field. The start bit defines the start of the network packet and the packet length defines the length of the network packet. Trunk controller 130 inserts into the arrival time field the relative time of day. Once the packet of FIG. 6 has been formed and input 513 of node 500-12 is idle, trunk controller 130 transmits this packet to node 500-12.

Node 500-12 examines the most significant bits of the address field and selects link 505 since these bits are zero. Before transmitting the packet to node 501-12 via output link 505, node 500-12 rotates the address field two bits to the left; this results in the two most significant bits becoming the least significant bits, and the two middle bits of the address field shown in FIG. 6 becoming the two most significant bits.

Node 501-12 examines the address field upon receiving it and selects output 512 since the most significant bits are zero. Node 501-12 also rotates the address field two bits to the left. Node 501-12 transmits the packet to node 502-0 via the output terminal 512. Upon receipt of the packet, node 502-0 examines the address field and selects output terminal 514 since the two most significant bits of the address are zero. Upon receiving the packet, trunk controller 129 strips off the start bit, network address field, and network packet length, and transmits to central processor 115 the packet identifier, logical address, time stamp, and data fields plus a recalculated CRC field.

A second example will be used to help illustrate the operation of switching array 170 as shown in FIG. 5. This will be done by following the transmission of the packet shown in FIG. 4 through switching array 170 from trunk 118 to trunk 117. Upon receipt of the packet shown in FIG. 4, trunk controller 131 forms the packet shown in FIG. 7. After forming this packet, trunk controller 131 transmits this packet to switching node 500-15 via input terminal 515. Switching node 500-15 examines the two most significant bits of the network address field (in this example a binary three), and selects link 516 to transmit the packet shown in FIG. 7. Before switching node 500-15 starts to transmit the packet via link 516, switching node 500-15 performs a left rotate operation on the network address field, and the result is the packet shown in FIG. 8. Upon receiving the packet from switching node 500-15, switching node 501-15 examines the two most significant bits of the network address field as shown in FIG. 8 and selects output 517 to transmit the packet out. Before transmitting the packet, switching node 501-15 performs a left rotate operation on the packet, resulting in the packet shown in FIG. 9. Upon receiving the packet of FIG. 9, switching node 502-12 responds to the network address field by transmitting the packet to trunk controller 130 via conductor 135. Switching node 502-12 also performs the left rotate operation on the network address field. The packet that is transmitted to trunk controller 130 via conductor 135 is identical to the packet shown in FIG. 9 with the network address field rotated. Trunk controller 130 forms a new packet which is identical to that shown in FIG. 9 with the exception that the start bit, network packet length, destination trunk controller, source trunk controller, control, and arrival time fields have been eliminated, a new CRC field has been calculated and inserted, and the time stamp field has been updated. Trunk controller 130 then retransmits this new packet on trunk 117.

Figure 10:
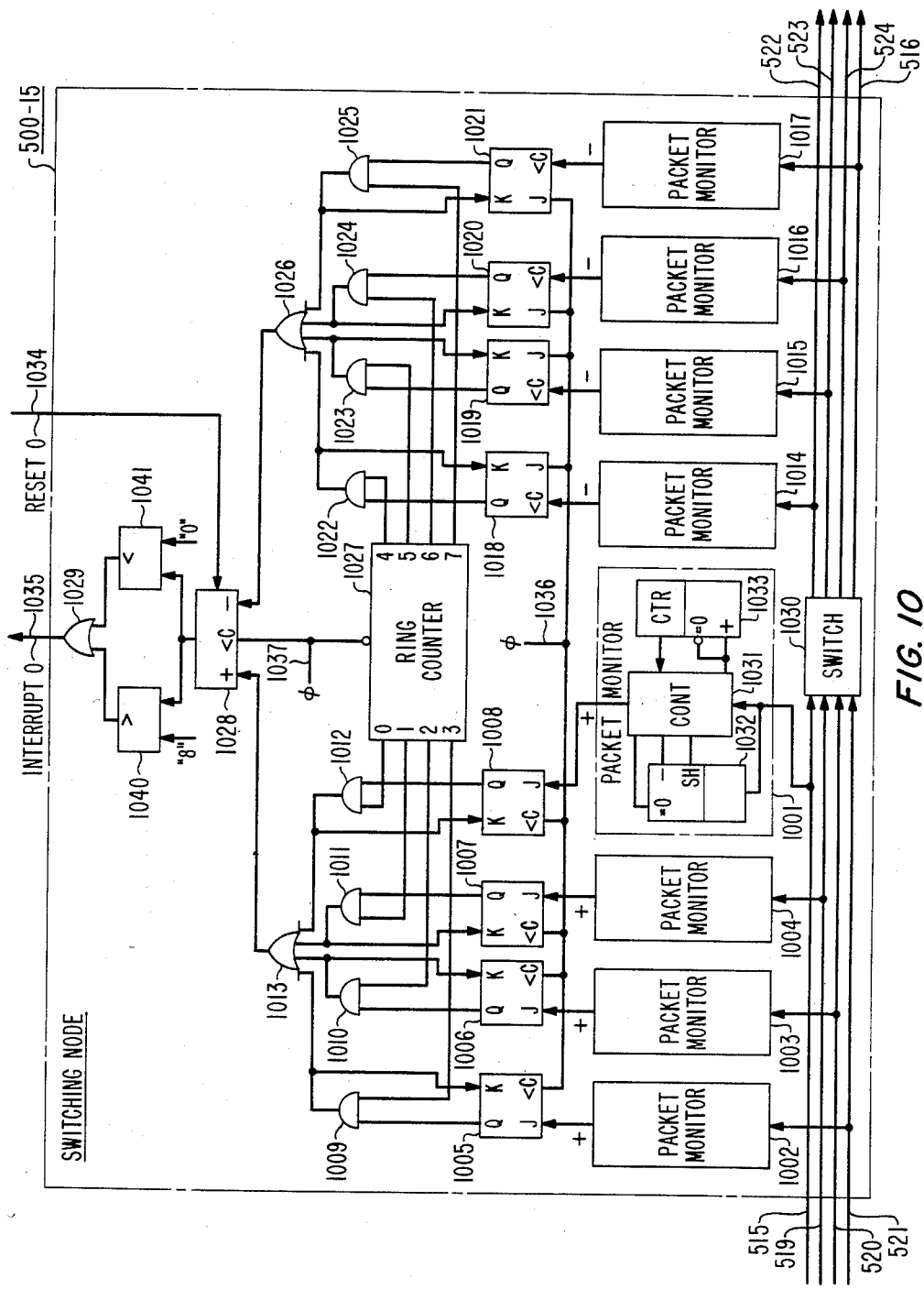
FIG. 10 illustrates, in a detailed block diagram, switching node 500-15 of switching network 116 which is the subject of the present invention.

Switching node 500-15 is shown in greater detail in FIG. 10. The other switching nodes are identical to switching node 500-15. Switching node 500-15 switches packets received on any one of four input conductors 515, 519, 520, or 521 to any of four output conductors 522, 523, 524, or 516 via switch 1030, which is described with respect to FIG. 11. Additionally, switching node 500-15 monitors incoming and outgoing packets from switch 1030, and generates an interrupt "0" signal indicating an error condition whenever the difference between the number of incoming and outgoing packets exceeds eight, or when the circuit indicates that there have been more outgoing packets than incoming packets. Switching node 500-15 uses two identical circuits: one that increments counter 1028 each time an incoming packet is received, and one that decrements counter 1028 each time an outgoing packet is transmitted to the next node.

Incoming packets to switch 1030 are monitored by packet monitors 1001 through 1004. Each time one of the packet monitors detects a new packet, it sets its corresponding flip-flop 1005 through 1008. Similarly, outgoing packets from switch 1030 are monitored by packet monitors 1014 through 1017, which set their corresponding flip-flops 1018 through 1021 each time a new outgoing packet is detected. Flip-flops 1005 through 1008 and 1018 through 1021 receive their timing signal from the rising edge of the phi clock pulse via conductor 1036 which is generated by system clock 161. Ring counter 1027 continually counts from 0 to 7 under control of the trailing edge of the phi clock pulse via conductor 1037. The counting is such that, at any one point, exactly one of the outputs 0 through 7 is a "1", while all of the other outputs are a "0". Each time one of the outputs is a "1", it places a "1" on one input of the corresponding AND gates 1009 through 1012, and 1022 through 1025 which conditions the AND gate to transmit the output of the corresponding flip-flop to counter 1028 via gate 1013 or 1026. If the corresponding flip-flop 1005 through 1008, or 1018 through 1021 had previously been set by the corresponding packet monitor 1001 through 1004, or 1014 through 1017, then the "1" from ring counter 1027 causes counter 1028 to either increment (if an incoming packet is detected) or decrement (if an outgoing packet is detected).

Circuit operation is such that during normal operation, counter 1028 should never be greater than eight or less than zero. If counter 1028 does become greater than eight, an error is present, and an interrupt "0" signal is generated via comparator 1040, OR gate 1029 and conductor 1035. Similarly, if counter 1028 becomes less than zero, an error is present, and an interrupt "0" signal is generated via comparator 1041, OR gate 1029, and conductor 1035. These interrupts are forwarded to processor 115 via maintenance channel 200, which is described with respect to FIG. 12. After the interrupt is acknowledged by processor 115, maintenance channel 200 resets counter 1028 via a signal on conductor 1034.

Consider an example of packet monitor 1001 detecting an incoming packet and incrementing counter 1028. An incoming packet consists of a start bit, followed by the 8-bit length field, followed by the remainder of the packet. Upon receipt of the start bit, control 1031 causes the length field of the packet to be shifted into register 1032 under control of counter 1033. The length field is used to determine when the entire packet has been transferred through switch 1030. The presence of the start bit also causes control 1031 to set flip-flop 1008, via the "J" input. When flip-flop 1008 is set, it places a "1" on one of the inputs to AND gate 1012. via the "Q" output. When ring counter 1027 reaches 0, it places a "1" on the other input to AND gate 1012; this causes counter 1028 to increment, via OR gate 1013. The output of AND gate 1012 also resets flip-flop 1008 via the "K" input. After the entire packet has been transferred through switch,1030 (indicated by register 1032, which contains the packet length, being decremented to zero), packet monitor 1001 becomes responsive to a packet acknowledge signal on conductor 515. Upon receipt of this packet acknowledge signal, packet monitor 1001 is cleared via control 1031, and is thus able to receive the next incoming packet.

Control 1031 advantageously comprises a programmable logic array (PLA) and flip-flops in a VLSI circuit or a PLA such as the Signetics Corporation's 82S100 with additional flip-flop circuits.

Figure 11:
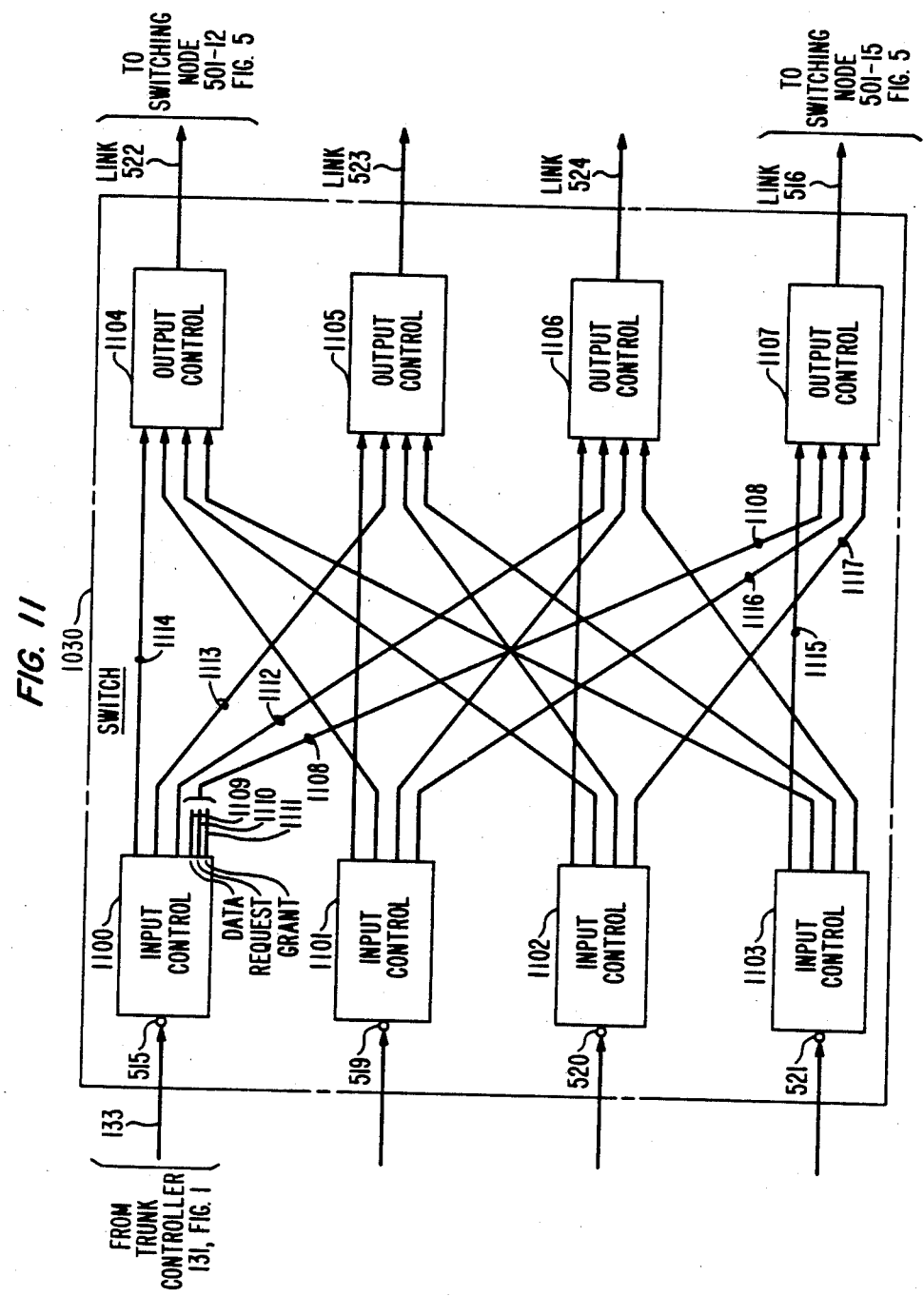
FIG. 11 is a detailed block diagram of switch 1030 of switching node 500-15.

Switch 1030 is illustrated in greater detail in FIG. 11. Switch 1030 consists of four input controls which can transmit information to any one of four output controls. The input controls 1100 through 1103 are connected to the output controls 1104 through 1107 via cables. For example, input control 1100 is connected to output control 1107 via cable 1108. Cable 1108 comprises three conductors 1109, 1110, and 1111. The other interconnecting cables on FIG. 11 are identical in design to cable 1108.

When input control 1100 has a packet to transmit to output control 1107, it transmits a request signal via conductor 1110 to output control 1107. Input control 1100 continuously transmits this request signal until the entire packet has been transmitted to output control 1107. When output control 1107 is free to receive information from input control 1100, output control 1107 transmits a grant signal via conductor 1111 to input control 1100. Upon receipt of the grant signal, input control 1100 commences to transmit the packet to output control 1107 via conductor 1109.

For example, the packet shown in FIG. 7 would be transmitted through switching node 500-15 as illustrated in FIG. 11 in the following manner. When input control 1100 recognizes the start bit, it has already received not only the start bit but also the two most significant bits of the network address. Input control 1100 decodes the two most significant bits of the network address field and determines that the packet was to be transmitted to output control 1107 via cable 1108. Input control 1100 requests permission to start transmission via conductor 1110; and when output control 1107 returns the grant signal via conductor 1111, input control 1100 starts the transmission of the packet to output control 1107 via cable 1108. Before transmitting the network address field, input control 1100 left rotates this address two bits so that the network address transmitted is that shown in FIG. 8. Upon receipt of the start bit of the packet, output control 1107 starts to retransmit this packet out on link 516.

Maintenance channel 200 is shown in greater detail in FIG. 12. Maintenance channel 200 allows the central processor to transmit and receive maintenance information to one or all trunk controllers under its control, and to receive interrupts and transmit corresponding reset signals to any of the switching nodes under its control. The maintenance channel information does not pass through the switching network, and thus allows the central processor to communicate with any trunk controller or switching node even though the switching network is out of service.

Maintenance channel 200 comprises a number of node maintenance circuits (NMCs), such as NMC 1201 and 1202. Each NMC is connected to maintenance bus 1206 via a cable. For example, NMC is connected to maintenance bus 1206 via cable 1209. Each NMC functions by receiving interrupt signals from its associated switching nodes, forwarding the interrupt to central processor 115, and resetting the counter in the switching node that generated the interrupt. For example, if switching node 500-15 generates an interrupt, the interrupt is received by NMC 1201 via conductor 1025. Control 1210 of NMC 1201 responds to the interrupt by generating an interrupt packet, which it forwards to central processor 115 via cable 1209 and maintenance bus 1206. This interrupt packet contains a source field that identifies switching node 500-15 as the node that generated the interrupt. Upon receipt of the interrupt packet, central processor 115 performs the required maintenance activity, and generates a reset packet, which it forwards to NMC 1201 via maintenance bus 1206 and cable 1209. Control 1210 is responsive to this reset packet to reset counter 1028 of switching node 500-15 via a signal on conductor 1034.

Additionally, maintenance channel 200 comprises a number of trunk controller board maintenance circuits (TCBMCs), such as TCBMC 1203 and TCBMC 1204, each of which can accommodate up to eight trunk controllers, such as trunk controller 131 or 140. Maintenance channel 200 runs under control of bus timing circuit 1205, which uses an arbitration scheme, as described in U.S. Pat. No. 3,749,845. Each TCBMC is connected to maintenance bus 1206 via a cable. For example, TCBMC 1203 is connected to maintenance bus 1206 via cable 1207. Each trunk controller in turn is connected to the TCBMC via another cable. For example, trunk controller 131 is connected to TCBMC 1203 via cable 1208.

Communication within maintenance channel 200 is provided by packets, as shown in FIG. 13. Within the packet, the source field (SRC) is the source of the packet, and the destination field (DST) is the destination of the packet. The command field (CMD) specifies the type of packet. For trunk controller maintenance packets, there are eight types, which are used for reading and writing the maintenance registers in the individual trunk controllers and individual TCBMCs. For switching nodes, there are three packet types, as follows: send an interrupt from a switching node to central processor 115, reset a single node, and reset all nodes associated with a single NMC. The data field contains the information that is to be written into, or has been read from, the appropriate maintenance register. The data field is not used with switching node maintenance packets.

Input control 1100 is shown in FIG. 11 of U.S. Pat. No. 4,490,230 and is incorporated herein. Also, output control 1107 is shown in FIG. 13 of U.S. Pat. No. 4,490,230 and is incorporated herein. In addition, trunk controller 131 is shown in FIGS. 14 through 58 of U.S. Pat. No. 4,490,230 and is incorporated herein.

It is to be understood that the above-described embodiment is merely illustrative of the principles of this invention; other arrangements may be devised by those skilled in the art without departing from the spirit and scope of the invention.

What is claimed is:

1. An arrangement for checking a packet switch node, comprising
means for determining bit signals representing the difference between the number of packets received by said packet switch node and the number of packets transmitted by said packet switch node;
means responsive to said determined bit signals to check for excursions of said determined bit signals beyond predefined difference limits for indicating inoperative conditions in said node;
said determining means comprises counter means responsive to the receipt of one of said packets to increment said determined bit signals and further responsive to the transmission of another one of said packets for decrementing said determined bit signals;
said node further comprises a plurality of input terminals and a plurality of output terminals and said determining means further comprises a plurality of input packet monitor means each associated with one of said input terminals for generating a packet receive signal upon the receipt of said one of said packets and a plurality output packet monitor means each associated with one of said output terminals for generating a packet transmitted signal upon transmission of said other one of said packets for the determination of said determined bit signals;
said determining means further comprises means for sampling each of said packet monitor means to detect the generation of said receive packet signal and said transmitted packet signal to control the determination of said determined bit signals;
said sampling means comprises a plurality of storage means each associated with an individual one of said packet monitor means for storing said packet receive signal and said packet transmitted signal;
ring counter means for controlling the storage of said packet receive and packet transmitted signals into said plurality of storage means; and logical means connected to the output of each of said storage means for updating said determined bit signals upon the storage of said packet receive and packet transmitted signals in ones of said storage means.

2. The arrangement of claim 1 wherein each of said packets comprises a length field defining the number of bits in said packet and each of said input packet monitor means comprises means for detecting the start of said one of said packets to generate said receive packet signal;

means for storing the contents of the length field of said one of said packets;

counting means responsive to each bit signal of said packets for counting the receipt of each bit signal of said one of said packets; and means responsive to the contents of said counter means being equal to the stored contents of said length field for indicating the entire receipt of said one of said packets.

3. The arrangement of claim 2 wherein each of said input packet monitor means further comprises control means for controlling said counting means and said packet length field storing means to respond to the next one of said packets in response to the indication of said entire receipt of said one of said packets.

4. The invention of claim 1 wherein said generating means comprises means responsive to a set of predefined signals defining the lower predefined difference limit being less than said determined bit signals for generating a first signal;

means responsive to another set of predefined signals defining the upper predefined difference limit being greater than said determined bit signals for generating a second signal; and means responsive to said first signal for generating an error signal and further responsive to said second signal for generating said error signal.

5. A fast packet switching network comprising
a plurality of input conductors;
a plurality of output conductors;
a plurality of switch nodes interposed between said plurality of input and output conductors, each of said nodes comprising:

means responsive to a receipt of predetermined number of address bit signals in one of a plurality of packets received from one of said input conductors for routing said packet to a subsequent one of said nodes or to one of said output conductors;

means for determining bit signals representing the difference between the number of said packets received and the number of said packets transmitted;

means responsive to said determined bit signals being less than a predefined set of bit signals for generating an error signal;

said generating means further responsive to said bit signals being greater than another predefined set of bit signals for generating said error signal;

said determining means comprises counter means responsive to the receipt of one of said packets to increment said determined bit signals and further responsive to the transmission of another one of said packets for decrementing said determined bit signals;

each of said nodes further comprises a plurality of input terminals and a plurality of output terminals and said determining means further comprises a plurality input packet monitor means each associated with one of said input terminals for generating a packet receive signal upon the receipt of said one of said packets and a plurality output packet monitor means each associated with one of said output terminals for generating a packet transmitted signal upon transmission of said other one of said packets for the determination of said determined bit signals;

said determining means further comprises means for sampling each of said packet monitor means to detect the generation of said receive packet signal and said transmitted packet signal to control the determination of said determined bit signals;

said sampling means comprises a plurality of storage means each associated with an individual one of said packet monitor means for storing said packet receive signal and said packet transmitted signal;

ring counter means for controlling the storage of said packet receive and packet transmitted signals into said plurality of storage means; and logical means connected to the output of each of said storage means for updating said determined bit signals upon the storage of said packet receive and packet transmitted signals in ones of said storage means.

6. The arrangement of claim 5 wherein each of said packets comprises a length field defining the number of bit signals in said packet and each of said input packet monitor means comprises means for detecting the start of said one of said packets to generate said receive packet signal;

means for storing the contents of the length field of said one of said packets;

counting means responsive to each bit signal of said packets for counting the receipt of each bit signal of said one of said packets; and means responsive to the contents of said counter means being equal to the stored contents of said length field for indicating the entire receipt of said one of said packets.

7. The arrangement of claim 6 wherein each of said input packet monitor means further comprises control means for controlling said counting means and said packet length field storing means to respond to the next one of said packets in response to the indication of said entire receipt of said one of said packets.

8. The invention of claim 5 wherein said generating means comprises means responsive to said set of predefined signals being less than said determined bit signals for generating a first signal;

means responsive to said other set of predefined signals being greater than said determined bit signals for generating a second signal; and means responsive to said first signal for generating said error signal and further responsive to said second signal for generating said error signal.

9. The arrangement of claim 5 wherein each of said nodes further comprises means for repositioning said predetermined number of address bits to a different location in said packet incident to said routings.

10. The arrangement of claim 9 wherein said repositioning means comprises;

first and second shift register circuits each having an input and an output means said input means of said first shift register circuit connected to said routing means for receiving said packet of information, therefrom, and said input means of said second shift register circuit connected to said output means of said first shift register circuit for receiving said packet of information;

selecting means operable for selecting said packet of information from said output means of said first and second shift register circuits; and control means responsive to said address bits for operating said selecting means to sequentially select said one of said packets of information to effect a rotation of said most significant bits to said least significant bits in said one of said packets of information.

11. The arrangement of claim 5 wherein said packet switching network further comprises processor means and an interface facility interconnecting said processor means and each of said nodes;

interface facility responsive to said error signal for transmitting a maintenance packet to said processor means;

said processor means responsive to said maintenance packet for recording the occurrence of an error; and said processor means further responsive to said maintenance packet for transmitting another maintenance packet to the node in error via said interface facility to reset said determined bit signals to an initial set of bit signals.

12. A packet switching network communicating a plurality of packets comprising:

first and second switching stages each having a plurality of switching elements;

each of said elements comprising a plurality of input and output terminals;

each of said input terminals of said first stage being connectable to an individual input conductor;

means connecting each of said output terminals of said first stage to an individual one of said input terminals of said second stage;

each of said output terminals of said second stage being connectable to an individual output conductor;

each of said elements further comprising for each one of said input terminals thereof;

means for storing address and other digital signals of one of said packets received on said each one of said input terminals;

controller means for controlling said storing means to commence a transmission therefrom of said address and other digital signals of said one of said packets upon a receipt of a control signal indicating an idle condition of the one of said output terminals identified by the stored address signals of said packet in said storing means;

each of said elements further comprising means for detecting the loss of ones of said packets in each of said elements by monitoring the number of packets received on said input terminals and the number of packets transmitted on said output terminals;

said detecting means comprises means for determining bit signals representing the difference between said number of received packets and said number of transmitted packets;

means responsive to said determined bit signals being less than a predefined set of bit signals for generating an error signal and further responsive to said bit signals being greater than another predefined set of bit signals for generating said error signal;

said determining means comprises counter means responsive to the receipt of one of said received packets to increment said determined bit signals and further responsive to the transmission of one of said transmitted packets for decrementing said determined bit signals;

said detecting means further comprises a plurality of input packet monitor means each associated with one of said input terminals for generating a packet received signal upon receipt of said one of said received packets and a plurality of output packet monitor means each associated with one of said output terminals for generating a packet transmitted signal upon transmission of said one of said transmitted packets for the determination of said determined bit signals;

said detecting means further comprises means for sampling each of said input packet monitoring means to detect the generation of said packet received signal and said packet transmitted signal to control the determination of said determined bit signals;

said sampling means comprises a plurality of storage means each associated with an individual one of said packet monitor means for storing said packet received signal and said packet transmitted signal;

ring counter means for controlling the storage of said packet received and packet transmitted signals into ones of storage means; and logical means connected to the output of each of said storage means for updating said determined bit signals upon the storage of said received packet and transmitted packet signals in said ones of said storage means.

13. The arrangement of claim 12 wherein said one of said received packets comprises a length field defining the number of bit signals in said one of said received packets and each of said input packet monitor means comprises means for detecting the start of said one of said received packets to generate said packet received signal;

means for storing the contents of the length field of said one of said received packets;

counting means responsive to each bit signal said one of said received packets and said detection of the start of said one of said received packets for counting the receipt of each bit signal of said one of said packets; and means responsive to the contents of said counter means being equal to the stored contents of said stored length field for indicating the entire receipt of said one of said received packets.

14. The arrangement of claim 13 wherein each of said input packet monitor means further comprises control means responsive to said indication of said entire receipt of said one of said received packets for controlling said counting means and said packet length field storing means to respond to the next one of said received packets.

15. The invention of claim 12 wherein said generating means comprises means responsive to said determined bit signals being less than said predefined set of bit signals for generating a first signal;

means responsive to said other set of predefined signals being greater than said determined bit signals for generating a second signal; and means responsive to said first signal for generating said error signal and further responsive to said second signal for generating said error signal.

* * * * *